United States Patent
Davis et al.

(10) Patent No.: US 6,829,911 B2
(45) Date of Patent: Dec. 14, 2004

(54) MAKING A GLASS OPTICAL FIBER WITH A GRATING THEREON

(75) Inventors: Monica K Davis, Belmont, MA (US); James C Fajardo, Painted Post, NY (US); Glenn E Kohnke, Corning, NY (US); Gang Qi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/929,469

(22) Filed: Aug. 13, 2001

(65) Prior Publication Data

US 2003/0029201 A1 Feb. 13, 2003

(51) Int. Cl.[7] ............................................. C03B 37/023
(52) U.S. Cl. .............................. 65/377; 65/384; 65/392
(58) Field of Search ........................... 65/384, 377, 392

(56) References Cited

U.S. PATENT DOCUMENTS

| | | | | | |
|---|---|---|---|---|---|
| 4,566,754 | A | * | 1/1986 | Beales et al. ................ | 385/123 |
| 4,599,098 | A | * | 7/1986 | Sarkar .......................... | 65/421 |
| 5,907,652 | A | * | 5/1999 | DiGiovanni et al. ........ | 385/125 |
| 5,999,679 | A | * | 12/1999 | Antos et al. ................. | 385/127 |
| 6,075,625 | A | * | 6/2000 | Ainslie et al. ................. | 359/3 |
| 6,321,007 | B1 | * | 11/2001 | Sanders ........................ | 385/37 |
| 2002/0126370 | A1 | * | 9/2002 | Broderick et al. .......... | 359/332 |
| 2002/0126944 | A1 | * | 9/2002 | Kim et al. .................... | 385/15 |
| 2002/0139151 | A1 | * | 10/2002 | Davis et al. .................. | 65/419 |

OTHER PUBLICATIONS

Salvatore et al. *"Fiber–Bragg–stabilized lasers power amplifiers for DWDM"*, Laser Focus World, Nov. 1999, pp 113–118.

Ky et al. *"Effects of drawing tension on the photosensitivity of Sn–Ge– and B–Ge–codoped core fiber"*, Optical Society of America, Optic Letters, Vo. 23, No. 17, Sep. 1, 1998, pp 1402–1404.

Xie et al., *"Experimental evidence of two types of photorefractive effects occurring during photoinscriptions of Bragg gratings within germanosilicate fibers"*, Elsevier Science Publishers BV, Optics Communication 104, 1993, pp 185–195.

Fonjallaz et al., *"Tension increase correlated to refractive–index change in fibers containing UV–written Bragg gratings"*, Optical Society of America, Optics Letters, vol. 20, No. 11, Jun. 1, 1995, pp 1346–1348.

Atkins et al., *"Control of Defects in Optical Fibers—A Study Using Cathodoluminescence Spectroscopy"*, Journal of Lightwave Technology, vol. 11, No. 11, Nov. 1993, pp 1795–1801.

Williams et al., *"Enhanced UV Photosensitivity in Boron Codoped Germanosilicate Fibres"*, Electronics Letters, Jan. 7, 1993, vol. 29, No. 1, pp 45–47.

Lemaire et al., *"High Pressure $H_2$ Loading As A Technique for Achieving Ultrahigh UV Photosensitivity And Thermal Sensitivity in $GeO_2$ Doped Optical Fibres"*, Electronics Letters, Jun. 24, 1993, vol. 29, No. 13, pp. 1191–1192.

Dong et al., *"Enhanced Photosensitivity in Tin–Codoped Germanosilicate Optical Fibers"*, IEEE Photonics Technology Letters, vol. 7, No. 9, Sep. 1995, pp. 1048–1450.

* cited by examiner

*Primary Examiner*—John Hoffmann
(74) *Attorney, Agent, or Firm*—Svetlana Z. Short

(57) ABSTRACT

A method for manufacturing optical fiber with enhanced photosensitivity comprising the step of: forming a molten layer of glass and drawing a fiber from the molten layer of glass at a temperature of between about 1900° C. and 1995° C. Draw tension can be adjusted to attain the desired draw speed.

23 Claims, 3 Drawing Sheets

US 6,829,911 B2

MAKING A GLASS OPTICAL FIBER WITH A GRATING THEREON

FIELD OF THE INVENTION

The invention relates generally to the production of optical fibers and more specifically to a method of producing optical fibers having enhanced photosensitivity.

BACKGROUND OF THE INVENTION

Optical fibers are used in a variety of applications, including communications systems, optical computers, laser tuning devices, and the like. Optical fibers, generally having a diameter in cross-section of about 125 μm are composed of at least two portions, a central core and a cladding layer disposed about the core. The cladding layer has an index of refraction which is less than that of the core, with a typical index variation from the core to the cladding layer being in the range from about 0.003 to 0.03.

Typically, in the manufacture of optical fiber, a glass layer, e.g. a glass rod is formed and molten glass is formed by suspending the rod in a furnace. The optical fiber is drawn from the molten glass by a capstan, or other mechanism to form the fiber. Conventionally, the draw temperature is between 2025° C. and 2045° C.

It is well known to form gratings, such as Bragg gratings or long period gratings, in optical fibers to change the characteristics of the fiber for various applications such as wavelength division multiplexing (WDM), filtering, gain flattening, laser tuning and the like. Such gratings can be formed by creating portions of the fiber having a different index of refraction with respect to adjacent portions of the fiber. The changes in index of refraction can be accomplished by exposing the fiber to a focused source of radiation, such as ultraviolet (UV) light in the wavelength range of 193 nm to 248 nm, inclusive. There are several theories on how UV exposure relaxation effect caused by the breaking of bending defects. Another theory is that the UV radiation induces a rearrangement of the molecular structure leading to compaction of the glass matrix. In any event, it is well accepted that UV radiation can be used to alter the index of refraction in optical fibers and several methods for doing so, such as the "holographic method", are well known.

In some cases, enhanced photosensitivity of optical fibers has been linked to the presence of draw induces defects (DIDs) which are transformed during the drawing process into Ge related oxygen deficient centers (GODCs). It is known to foster such transformation by adjusting drawn tension of the optical fibers.

SUMMARY OF THE INVENTION

A first aspect of the invention is a method for manufacturing optical fiber with enhanced photosensitivity comprising the steps of forming a molten layer of glass and drawing a fiber from the molten layer of glass at a temperature of between about 1900° C. and 1995° C.

A second aspect of the invention is an improved method for manufacturing optical fiber with enhanced photosensitivity of the type wherein the fiber is drawn from a molten layer of glass at a predetermined temperature and a predetermined tension and at a predetermined rate. The improvement comprises the step of lowering the temperature that the fiber is drawn at between about 2% and 3% while increasing said preselected draw tension.

A third aspect of the invention is a method for manufacturing optical fiber with enhanced photosensitivity comprising the step of drawing the fiber from a molten layer of glass at a temperature of about 1985° C. and a tension of about 200 gm.

BRIEF DESCRIPTION OF THE DRAWINGS

The invention is described through a preferred embodiment and the drawing in which.

DETAILED DESCRIPTION

Glass layers, such as rods, used to form optical fibers of the preferred embodiment can be formed in any manner. In the preferred embodiment, rods are formed by a Modified Chemical Vapor Deposition (MCVD) process in which the chemicals, such as $GeCl_4$ and $SiCl_4$, with oxygen and other gases, are caused to flow into one end of a silica tube. The tube is heated to ignite the chemicals and to cause a reaction forming massive small glass particles, known as "soot", which is deposited onto the inner surface of the tube. The heated tube then sinters the particles to form layers of glass corresponding to the core and the cladding of a fiber. This process is repeated until a desired glass material is formed. The tube is then collapsed under a reduced condition to form a glass rod from which an optical fiber can be drawn.

Figure 1:
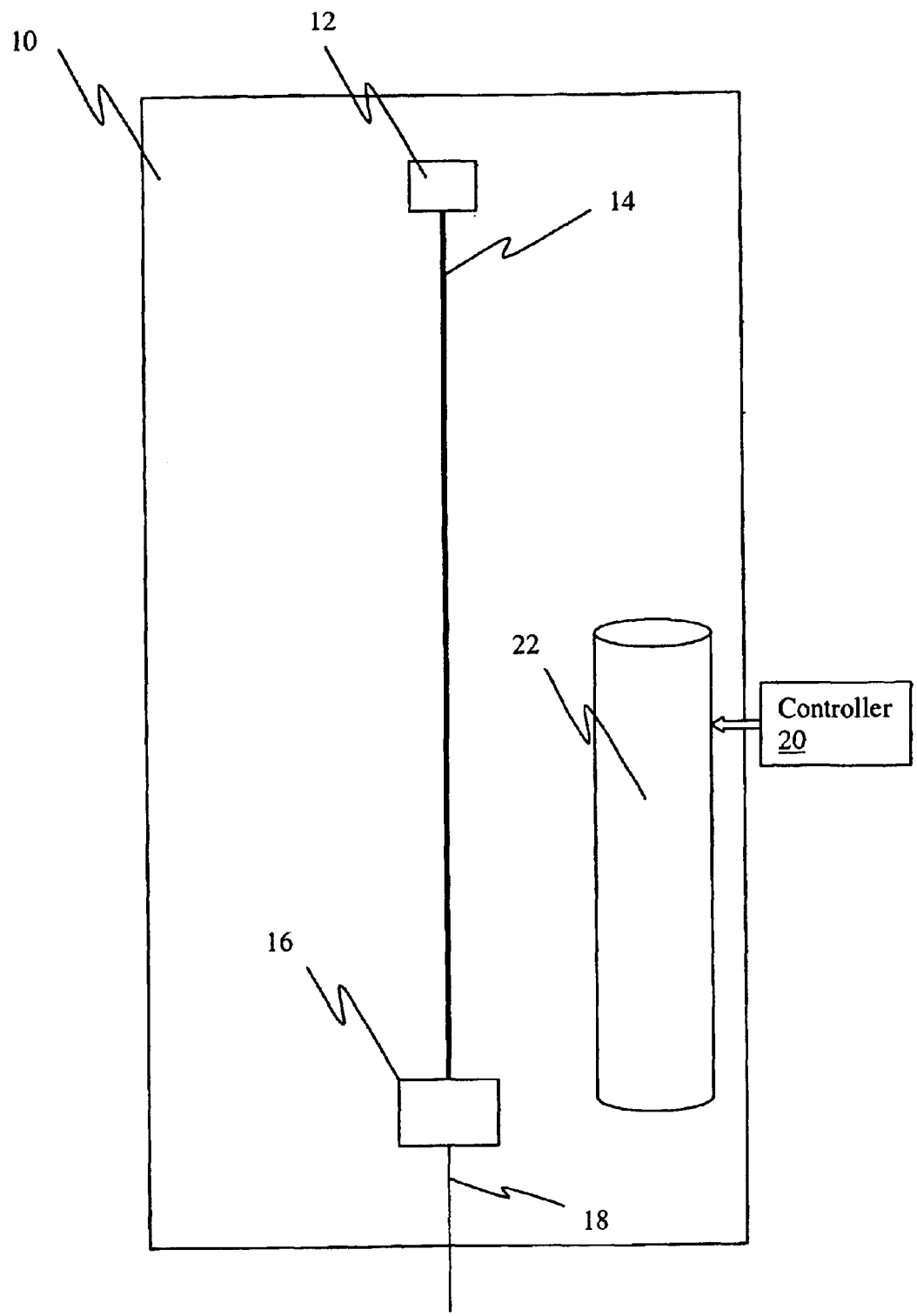
FIG. 1 is a schematic illustration of an apparatus for forming optical fibers in accordance with a preferred embodiment of the invention.

FIG. 1 illustrates an apparatus in accordance with a preferred embodiment for forming optical fibers. Draw furnace 10 includes suspension device 12, from which glass rod 14 can be suspended, and draw mechanism 16 (such as a capstan). Further, draw furnace 10 includes heating element 22, for raising the temperature in draw furnace 10 and controller 20 operatively couple to heating element 22 to control activation of heating element 22 and thus control the temperature in draw furnace 10. Controller 20 can be a solid state microprocessor device or any other device for controlling temperature and can include any type of sensor for providing closed loop or other types of control.

Glass rod 14 is heated by heating element 22 until at least a portion thereof proximate drawing mechanism 16 is molten. Drawing mechanism 16 is then activated to draw glass rod 14 at a predetermined tension to form the optical fiber 18 with the core and the cladding.

Applicant has discovered that controlling the draw temperature, i.e. the temperature of the molten end of glass rod 14, in a precise manner increases photosensitivity of the resulting optical fiber after drawing. Possibly, draw induced defects (DIDs) are more efficiently transformed during the drawing process into Ge related oxygen deficient centers (GODCs) in the resulting fiber. As noted above, an increased presence of GODCs is linked to enhanced photosensitivity of the resulting fiber.

Figure 2:
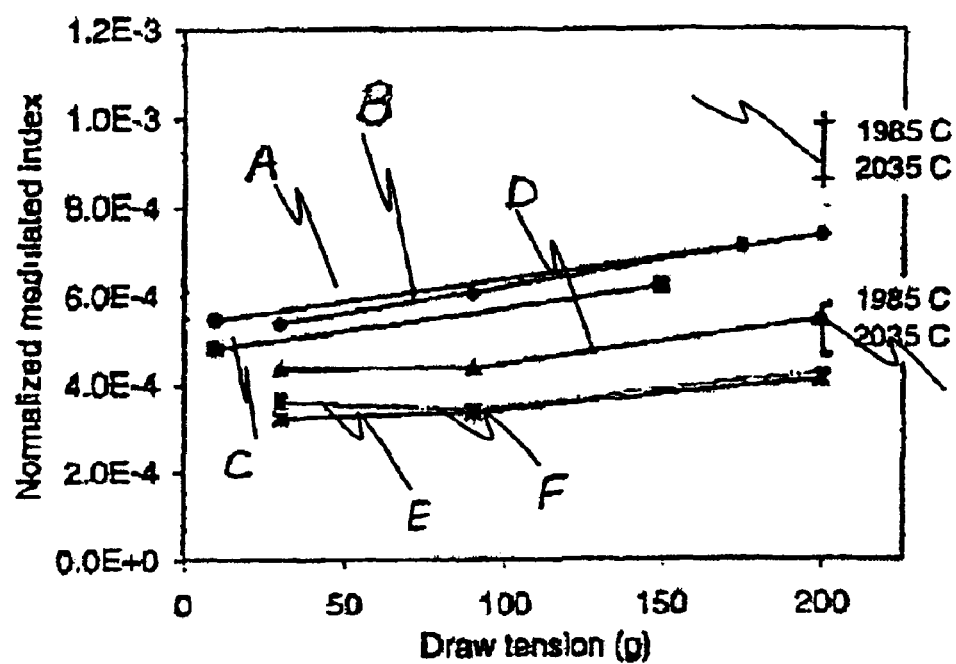
FIG. 2 is a graph illustrating results of testing on examples of optical fibers.

FIG. 2 is a graph of normalized modulated index (a unitless standard for grating forming efficiency) versus draw tension, showing curves for six different types of fibers drawn at a temperature of 2035° C. and two types of fibers drawn at constant draw tension and variable draw temperature. Curves C and D correspond to Ge and B co-doped Si fibers. Curves A, B, E, F, G, and H correspond to Ge—Si fibers. Fibers corresponding to curves G and H were drawn at constant draw tension of 200 g and varying draw temperatures.

Curves A, B, C, D, E, and F confirm that the normalized modulated index of the fibers increases slightly as draw tension increases. As noted above, curves G and H represent curves for respective fibers drawn at a constant tension of 200 g with draw temperature varied between 1985° C. and 2035° C. It can be seen that the normalized modulated index of the fibers increases dramatically as draw temperature is lowered from 2035° C. to 1985° C. Although the temperatures can be lowered to 1900° if the draw speed is significantly reduced (to 1 to 3 m/sec), at draw temperatures below 1900° C. it is difficult to reliably manufacture fibers without breakage and undesirable imperfections.

The test results presented in FIG. 2 illustrate the critical relationship between draw temperature and photosensitivity, normalized modulated index in particular. In particular, applicant has discovered that a reduction in draw temperature to a critical range of between 1975° C. and 1995° C., inclusive, results in improved photosensitivity for the purpose of forming optical gratings in the fiber. More preferably, the draw temperature is in the range of 1980° C. to 1990° C., inclusive, and more preferably about 1985° C. The preferred embodiment uses a draw temperature that is about 2–3% lower than conventional draw temperatures. Draw tension can be adjusted to provide a desired draw rate at the lower draw temperature. Preferably draw tension is in the range of 100 g to 250 g, inclusive and more preferably about 200 g.

Figure 3:
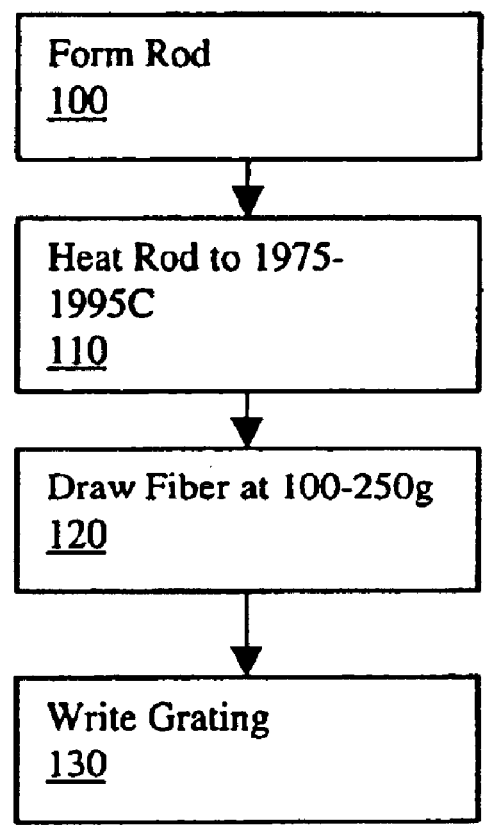
FIG. 3 is a flow chart of a manufacturing method in accordance with the preferred embodiment.

FIG. 3 illustrates the method of manufacturing optical fibers in accordance with the preferred embodiment. In step 100, a glass layer is formed in the form of rod 16. Step 100 can be accomplished using the MCVD process described above, using a standard chemical vapor deposition process (CVD), or in any other in any manner. Further, the layer can be doped in any desired manner, such as with germanium, to provide a doped fiber core.

In step, 110, the rod is heated to a molten state at a temperature of 1975° C.–1995° C. by controlling heating element 22 with controller 20 and drawn, by draw mechanism 16, at a constant tension somewhere in the range of 100–250 g in step 120. In step 130, a grating is written on the drawn fiber by exposing the fiber to ultraviolet radiation in the range of about 240–248 nm.

The invention can be applied to any type of optical fiber. Further, the invention is applicable to any type of grating formed by radiation. The fibers can be formed in various ways, from various materials, using various processes.

The invention has been described through a preferred embodiment. However, various modifications can be made without departing from the scope of the invention as defined by the appended claims and legal equivalents.

Parts List

10 Draw Furnace
12 Suspension Device
14 Glass Rod
16 Draw Mechanism
18 Optical Fiber
20 Controller
22 Heating Element

What is claimed is:

1. A method for manufacturing optical fiber with enhanced photosensitivity comprising the steps of:
    forming a molten layer of glass;
    drawing a fiber from said molten layer of glass at a temperature of between about 1975° C. and 1995° C.; and
    writing a grating on said optical fiber by exposing said fiber to ultraviolet radiation.

2. The method for manufacturing optical fiber with enhanced photosensitivity according to claim 1, wherein said drawing step further comprises drawing said fiber at a tension between 100 gm and 250 gm.

3. The method for manufacturing optical fiber with enhanced photosensitivity according to claim 2, wherein said draw tension remains constant throughout said drawing step.

4. The method for manufacturing optical fiber with enhanced photosensitivity according to claim 1, wherein said molten layer is manufactured in accordance with a chemical vapor deposition process.

5. The method for manufacturing optical fiber with enhanced photosensitivity according to claim 4, wherein said forming step comprises forming glass layers corresponding to a core and a cladding.

6. The method for manufacturing optical fiber with enhanced photosensitivity according to claim 1, wherein said molten layer is manufactured in accordance with a modified chemical vapor deposition process.

7. The method for manufacturing optical fiber with enhanced photosensitivity according to claim 1, further comprising the step of doping said optical fiber along a core portion.

8. The method for manufacturing optical fiber with enhanced photosensitivity according to claim 7, wherein said doping step comprises doping the core portion with germanium.

9. The method of manufacturing optical fibers with enhanced photosensitivity according to claim 7, wherein said doping step comprises doping the core portion with boron.

10. The method for manufacturing optical fiber with enhanced photosensitivity according to claim 1, wherein said drawing step comprises drawing said optical fiber at a temperature between about 1980° C. and 1990° C.

11. The method for manufacturing optical fiber with enhanced photosensitivity according to claim 1, wherein said ultra violet radiation is between about 193 and 248 nm in wavelength inclusive.

12. The improved method for manufacturing optical fiber with enhanced photosensitivity according to claim 1, wherein said molten layer of glass is manufactured in accordance with a modified chemical vapor deposition process.

13. A method for manufacturing optical fiber with enhanced photosensitivity comprising the steps of:
    drawing said fiber from a molten layer of glass at a temperature of about 1985° C. and a tension of about 200 gm; and
    writing a grating on said optical fiber by exposing said fiber to ultraviolet radiation.

14. The method of manufacturing optical fiber with enhanced photosensitivity according to claim 13, wherein said molten layer is manufactured in accordance with a chemical vapor deposition process.

15. The method for manufacturing optical fiber with enhanced photosensitivity according to claim 13, wherein said molten layer is manufactured in accordance with a modified chemical vapor deposition process.

16. The method for manufacturing optical fiber with enhanced photosensitivity according to claim 13, further comprising the step of doping said optical fiber along a core portion.

17. The method for manufacturing optical fiber with enhanced photosensitivity according to claim 16, wherein said step of doping comprises doping said core portions with germanium.

18. The method of manufacturing optical fiber with enhanced photosensitivity according to claim 16, wherein said doping step comprises doping step comprises doping the core portion with boron.

19. The method of manufacturing optical fiber with enhanced photosensitivity according to claim 13, wherein said ultraviolet radiation is between about 193 and 248 nm in wavelength inclusive.

20. A method for manufacturing optical fiber with enhanced photosensitivity comprising the steps of:

drawing said fiber from a molten layer of glass at a temperature of between about 1900° C. and 1995° C.; and writing a grating on said fiber by exposing said fiber to ultraviolet radiation.

21. A method for manufacturing optical fiber with enhanced photosensitivity comprising the steps of:

drawing said fiber from a molten layer of glass at a temperature of between about 1900° C. and 1995° C.; and doping said optical fiber along a core portion.

22. A method for manufacturing optical fiber with enhanced photosensitivity comprising the steps of:

forming a layer of molten glass;

drawing a fiber from said molten layer of glass at a temperature of under 2025° C. and tension of between 100 gm and 250 gm, and writing a grating on said optical fiber by exposing said fiber to ultraviolet radiation.

23. A method for manufacturing optical fiber with enhanced photosensitivity comprising the steps of:

forming a layer of molten glass;

drawing a fiber from said molten layer of glass at a temperature of under 2025° C. and at a tension of between 100 gm and 250 gm, and doping said optical fiber along a core portion.

* * * * *